(12) United States Patent
Fox et al.

(10) Patent No.: US 11,080,946 B2
(45) Date of Patent: Aug. 3, 2021

(54) METHOD AND SYSTEM FOR COLLECTING ACTIVITY-DATA

(71) Applicant: XSELIS, Inc., Cedar Park, TX (US)

(72) Inventors: Tyler Logan Fox, Cedar Park, TX (US); Kevin Tyler Gardenhire, Round Rock, TX (US)

(73) Assignee: XSELIS, Inc., Cedar Park, TX (US)

(*) Notice: Subject to any disclaimer, the term of this patent is extended or adjusted under 35 U.S.C. 154(b) by 127 days.

(21) Appl. No.: 16/001,526

(22) Filed: Jun. 6, 2018

(65) Prior Publication Data

US 2019/0378348 A1    Dec. 12, 2019

(51) Int. Cl.
| | |
|---|---|
| *G06F 13/00* | (2006.01) |
| *G07C 1/02* | (2006.01) |
| *H04L 29/08* | (2006.01) |
| *H04W 4/02* | (2018.01) |
| *G06N 20/00* | (2019.01) |

(52) U.S. Cl.
CPC ............ *G07C 1/02* (2013.01); *G06N 20/00* (2019.01); *H04L 67/18* (2013.01); *H04L 67/306* (2013.01); *H04W 4/02* (2013.01)

(58) Field of Classification Search
CPC ........ H04L 67/18; H04L 67/306; H04W 4/02; G07C 1/02; G06N 20/00
USPC ....... 709/224, 223, 203; 718/1, 100; 706/16, 706/20, 23, 25
See application file for complete search history.

(56) References Cited

U.S. PATENT DOCUMENTS

| | | | | |
|---|---|---|---|---|
| 8,437,507 | B2* | 5/2013 | Zhou ....................... | G06T 7/292 348/169 |
| 9,710,753 | B1* | 7/2017 | Shams ..................... | G06N 5/04 |
| 9,818,061 | B1* | 11/2017 | Shams ..................... | G06N 5/022 |
| 9,830,554 | B2* | 11/2017 | Shams ..................... | G06N 5/022 |
| 9,942,705 | B1 | 4/2018 | Haney | |
| 9,972,191 | B2* | 5/2018 | de Barros Chapiewski ................ | H04L 67/26 |
| 10,158,976 | B2* | 12/2018 | de Barros Chapiewski ................ | G08B 13/2462 |
| 10,469,990 | B2* | 11/2019 | de Barros Chapiewski ................ | G08B 13/2462 |
| 10,529,077 | B2* | 1/2020 | Mehrseresht ...... | G06K 9/00718 |
| 10,609,513 | B2* | 3/2020 | de Barros Chapiewski ................ | H04W 4/021 |
| 10,657,418 | B2* | 5/2020 | Marder .............. | G06K 9/00624 |
| 2011/0228982 | A1* | 9/2011 | Zhou .................. | G06K 9/00355 382/103 |
| 2014/0207533 | A1 | 7/2014 | Gregg | |
| 2017/0076212 | A1* | 3/2017 | Shams ..................... | G06N 5/022 |
| 2018/0225950 | A1* | 8/2018 | de Barros Chapiewski ................ | G08B 25/08 |
| 2018/0276735 | A1* | 9/2018 | Koenig .............. | G06Q 30/0251 |

(Continued)

*Primary Examiner* — Kenneth R Coulter
(74) *Attorney, Agent, or Firm* — Ziegler IP Law Group, LLC

(57) ABSTRACT

A method for collecting activity-data of a user executing a task including at least one activity includes tracking a user-device to determine a location-data of the user-device associated with the user; retrieving, at a server-arrangement from a database-server, a client-data; determining a change in the location-data of the user-device; and generating the activity-data, based on the change in the location-data, by one of correlating the location-data with the client-data by employing machine learning techniques, or processing a prompt-response generated by a manual-input at the user-device, wherein the prompt-response is generated based on a prompt provided by the server-arrangement to the user-device when the machine learning techniques fail to correlate the location data with the client-data.

26 Claims, 5 Drawing Sheets

(56) References Cited

U.S. PATENT DOCUMENTS

| | | |
|---|---|---|
| 2019/0188866 A1* | 6/2019 | Mehrseresht .......... G06N 3/084 |
| 2019/0197355 A1* | 6/2019 | Marder ................ G06K 9/6256 |
| 2020/0021944 A1* | 1/2020 | de Barros Chapiewski ................ H04L 67/18 |

* cited by examiner

METHOD AND SYSTEM FOR COLLECTING ACTIVITY-DATA

TECHNICAL FIELD

The present disclosure relates generally to tracking activities of users; and more specifically, to methods for collecting activity-data of users executing tasks including at least one activity. Furthermore, the present disclosure also relates to systems for collecting activity-data of users executing tasks including at least one activity.

BACKGROUND

In recent times, time management for performing an activity or a set of activity has become a prime concern for every individual. Accurate information related to efforts and time taken to execute the activity is crucial for determining and thereby, making improvements. In an example, for a sales executive, performing a sales task may spend his/her time on various essential activities as well as non-essential activities. In such an example, the sales executive may need to manage his/her time to complete the sales task assigned to him/her. Therefore, tracking time associated with the completion of the activity or set of activities is a prime concern for individuals performing a professional and/or personal activity.

Typically, the aforesaid individuals desire for optimum usage of their time which is important for maintaining a good efficiency. However, the individuals are unable to accurately collect and therefore are unable to manage their time. Furthermore, the individuals have a tendency to over-state and/and understate their time utilization pertaining to the activity they are involved, which can further result in loss of efficiency.

Conventionally, several methods and tools are used for tracking the time associated with the completion of the activity. In a United States patent application US20140207533A1 titled 'Method for recording and tracking the progress of sales activities' (Inventor: Stephen Payne Gregg; Applicant: Stephen Payne Gregg), there is described a method that teaches and enables tracking of a number of new prospects, phone calls made, in-person invites made, a number of new customers acquired and so forth. The tracked activities are displayed on a computer screen or in paper for each day of a week, along with a success report comprising the tracked activities in rows and columns and weekly goals of the user. Thus, the disclosure enables to track a user's actions and success during the week.

In another United States patent application U.S. Pat. No. 9,942,705B1 titled 'Location sharing group for services provision' (Inventor: Richard D. Haney; Applicant: X One Inc), there is described a system for exchanging GPS or other position data between wireless devices for purposes of group activities, child location monitoring, work group coordination etc. Conventionally, the existing methods and tools available for tracking location and/or time of people performing activities, are associated with several problems. Firstly, several time tracking software facilitates tracking time for various activities performed by the individual. However, such time tracking software requires individuals to remember to start and stop timers for their various activities throughout the day. As a result, the individual may spend an ample amount of time and manual efforts in activating the aforementioned time tracking software. Secondly, the existing methods and tools require the individual to remember to manually input various details associated with the activities. As a result, the individual may have to input a plenty of details himself/herself. Consequently, this can lead to inaccuracies and errors in collecting the activity data and further inaccuracies while analyzing the activity data. Thirdly, the existing methods and tools have a limitation of tracking the duration of the time invested by the individual in a part of the activity.

Therefore, in light of the foregoing discussion, there exists a need to overcome the aforementioned drawbacks associated with collection of activity data of the individuals performing the task.

SUMMARY

The present disclosure seeks to provide a method for collecting activity-data of a user executing a task including at least one activity.

The present disclosure also seeks to provide a system for collecting activity-data of a user executing a task including at least one activity.

The present disclosure seeks to provide a solution to the existing problem of providing manual inputs for tracking the at least one activity associated with the task. An aim of the present disclosure is to provide a solution that overcomes at least partially the problems encountered in prior art, and facilitates a reliable and time-efficient system that minimizes the requirement of manual input from the user by employing machine learning techniques, thereby saving time of the user.

In one aspect, an embodiment of the present disclosure provides a method for collecting activity-data of a user executing a task including at least one activity, the method comprising:
  tracking a user-device to determine a location-data of the user-device associated with the user;
  retrieving, at a server-arrangement from a database-server, a client-data;
  determining a change in the location-data of the user-device; and
  generating the activity-data, based on the change in the location-data, by one of
    correlating the location-data with the client-data by employing machine learning techniques, or
    processing a prompt-response generated by a manual-input at the user-device, wherein the prompt-response is generated based on a prompt provided by the server-arrangement to the user-device when the machine learning techniques fail to correlate the location data with the client-data.

In another aspect, an embodiment of the present disclosure provides a system for collecting activity-data of a user executing a task including at least one activity, the system comprising:
  a user-device having one or more sensing modules to track a location-data;
  a database-server for storing a client-data; and
  a server arrangement communicably coupled with the user-device and the database-server, wherein the server arrangement is configured to:
    track the user-device to determine the location-data of the user-device associated with the user;
    retrieve the client-data from the database-server;
    determine a change in the location-data of the user-device; and
    generate the activity-data, based on the change in the location-data, by one of correlating the location-data with the client-data by employing machine learning techniques, or processing a prompt-response generated by a manual-input at the user-device, wherein the prompt-response is generated based on a prompt provided by the server-arrangement to the user-device when the machine learning techniques fail to correlate the location data with the client-data.

Embodiments of the present disclosure substantially eliminate or at least partially address the aforementioned problems in the prior art, and enables accurate generation of the duration of the at least one activity performed by the user based on the change in the location-data, tracking of the location-data and completion time of the user to identify a nature of the at least one activity, and minimal input from individuals by employing machine learning techniques. The system and the method provide a user interface to allow the user to interact with the prompt on the user-device via a simple one-touch input. Therefore, the system and the method allow the user to swiftly, conveniently, efficiently and reliably provide the input associated with various activities of the task. It will be appreciated that enabling the user to swiftly, conveniently, efficiently and reliably provide the input, such as via the one-touch input, reduces a time and effort required of the user to provide the input. Additionally, errors associated with providing the input by the user are reduced. Thus, the user can devote the saved time and effort towards performing additional activities, thereby, increasing a productivity thereof.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
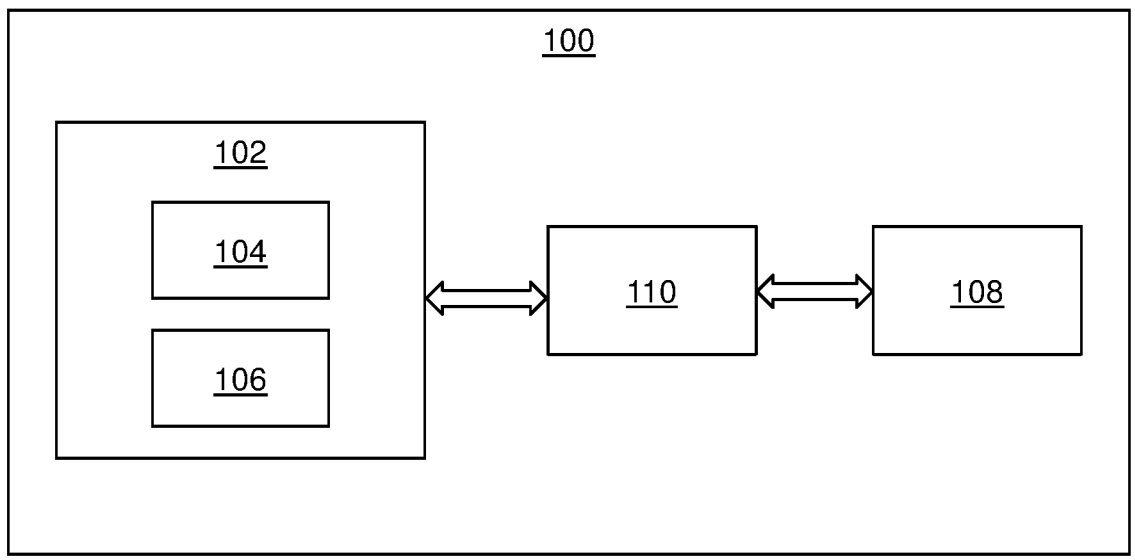
FIG. 1 illustrates a block diagram of a system for collecting activity-data of a user executing a task including at least one activity, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for collecting activity-data of a user executing a task including at least one activity, the method comprising:
  tracking a user-device to determine a location-data of the user-device associated with the user;
  retrieving, at a server-arrangement from a database-server, a client-data;
  determining a change in the location-data of the user-device; and
  generating the activity-data, based on the change in the location-data, by one of
    correlating the location-data with the client-data by employing machine learning techniques, or
    processing a prompt-response generated by a manual-input at the user-device, wherein the prompt-response is generated based on a prompt provided by the server-arrangement to the user-device when the machine learning techniques fail to correlate the location data with the client-data.

In another aspect, an embodiment of the present disclosure provides a system for collecting activity-data of a user executing a task including at least one activity, the system comprising:
  a user-device having one or more sensing modules to track a location-data;
  a database-server for storing a client-data; and
  a server arrangement communicably coupled with the user-device and the database-server, wherein the server arrangement is configured to:
    track the user-device to determine the location-data of the user-device associated with the user;
    retrieve of the client-data from the database-server;
    determine a change in the location-data of the user-device; and
    generate the activity-data, based on the change in the location-data, by one of
      correlating the location-data with the client-data by employing machine learning techniques, or processing a prompt-response generated by a manual-input at the user-device, wherein the prompt-response is generated based on a prompt provided by the server-arrangement to the user-device when the machine learning techniques fail to correlate the location data with the client-data.

The present disclosure provides the aforementioned method and the aforementioned system for collecting activity-data of a user executing a task including at least one activity. The method and system can accurately generate the duration of the activity performed by the user based on the change in the location-data. Additionally, the system tracks the location-data of the user to identify the nature of the activity and completion time thereof. Furthermore, the method and system require minimal input from individuals by employing machine learning techniques, thereby saves time of the user. Consequently, the present disclosure provides an effortless and less time-consuming solution for collecting activity-data. Moreover, the system provides a user interface to allow the user to interact with the prompt on the user-device. The user interface allows the user to conveniently provide the input to the prompt via a simple one-touch input (such as, by touching the user-device, hovering or pointing a finger over the user interface, by using a mouse, a touchpad or a keypad associated with the user-device and so forth), for example, as a single click or tap on the user interface. Consequently, the user can easily and swiftly resume their work after providing the input to the prompt. Thus, the user can save time and effort on providing the input and can further utilise the saved time on performing other activities, such as for making additional sales, thereby increasing a productivity thereof. Furthermore, inaccuracies and errors associated with receiving the input from the user is greatly reduced by employing the user interface for providing the input, as a result of which, a trust associated with the user increases for a second user (such as, for a manager or a boss of the user). Moreover, the second user can easily keep a track over proceedings and whereabouts of the user, which aids in increasing the productivity of the user (thereby, enabling to increase a profit for the second user) and further enables the second user to ensure a safety of the user. Furthermore, the second user can identify patterns associated with performing tasks by the user, thereby, enabling the second user to analyse strengths and weaknesses of the user and subsequently, manage the user's schedule accordingly (such as, by planning breaks for the user in-between activities), to further increase the productivity of the user and consequently, further increasing the profit for the second user.

It will be appreciated that the term "task" used herein relates to various activities to be performed by a user, in order to achieve a result. In one embodiment, the task may be professionally assigned to the user by a higher authority. In another embodiment, the task may be a personal task of the user. In one example, the task can be a sales project, such as a daily, weekly, monthly or yearly sales project. In such an example, the user may be required to execute the task by meeting various daily, weekly, monthly or yearly goals associated with the sales project (such as, performing a predefined number of sales).

Throughout the present disclosure the term "at least one activity" used herein relates to different errands performed by the user while completing the task. In an example, the at least one activity may comprise travelling from one location to another to complete the task. In another example, the at least one activity may comprise performing the assigned task or performing an unassigned task. In yet another example, the at least one activity may comprise executing an errand that is not associated with the task. In such an example, such errand may be unproductive or productive, based on the user's preference. It will be appreciated that various activities performed by the user while performing the task are associated with the activity-data. Furthermore, when the task is associated with the sales project (as mentioned hereinabove), the at least one activity can be associated with performing a sale of a product or a service, such as by a salesman (or a sales agent), to a specific client (comprising one or more persons, a company and so forth).

In an instance, a user 'A' is assigned a task of conducting a meeting with a person 'C' at a location 'X', wherein the user is currently at a location 'Z'. In such an instance, the task comprises various activities such as travelling from location 'Z' to the location 'X', having lunch, conducting the meeting with the person 'C' and so forth. In this regard, information regarding aforementioned various activities such as a start time of the activity, an end time of the activity, a completion time of the activity, and a nature of the activity are classified as the activity-data.

The system for collecting activity-data of a user executing a task including at least one activity, comprises the user-device having the one or more sensing modules and the server-arrangement communicably coupled with the user-device and database-server.

Throughout the present disclosure, the term "user-device" used herein relates to a portable electronic computing device associated with the user. Examples of the user-device may include, but are not limited to, a personal computer, a hand-held computing device, a tablet, a laptop, a mobile computer, a wearable computer, a communication device such as a cell phone, a personal digital assistant and the like. In an embodiment, the user-device may comprise hardware, firmware, or a combination of these operable to receive the information. Moreover, the user-device includes a plurality of electronic components for example, such as a microprocessor, a graphics processor unit (GPU), a memory unit, a battery, and the user interface.

Throughout the present disclosure, the term "server-arrangement" used herein relates to a structure and/or module that include programmable and/or non-programmable components configured to receive, store, process and/or share the activity-data of the user. In an example, the server-arrangement may include components such as a memory unit, a processor, a network adapter and the like, to receive, store, process and/or share activity-data of the user. The server-arrangement can include a single server or multiple servers communicably coupled with each other. Optionally, the server-arrangement is a server deployed in a cloud environment which is connected to the remote servers. Optionally, the server-arrangement is implemented as two or more servers operating in a parallel and/or in a distributed architecture.

Furthermore, the server arrangement is communicably coupled with the user-device through a communication network. Optionally, the user-device is communicably coupled to the server arrangement via a wired network, a wireless network, or any combination thereof. Examples of the communication network between the user-device and the server arrangement include, but are not limited to, Local Area Networks (LANs), Wide Area Networks (WANs), Internet, radio networks, telecommunication networks. In an embodiment, the communication between the server arrangement and the user-device occurs over short-range networks and/or long-range networks.

As mentioned previously, the method comprises tracking the user-device to determine the location-data of the user-device associated with the user. Specifically, the server-arrangement is configured to track the user-device to determine the location-data of the user-device associated with the user. It will be appreciated that the user-device has a unique identification number. In an example, the unique identification number may be one of: international mobile station identification number and International Mobile Station Equipment Identity. The server-arrangement communicates with the user-device using the unique identification number to track the user-device. Once the user-device is tracked, the server-arrangement determines the location-data of the user-device using one or more sensing modules.

Throughout the present disclosure, the term "location-data" used herein relates to geographical coordinates of the user-device along with movement (such as velocity with which the user-device associated with the user is moving) when communication is established between the user-device and the server-arrangement.

Optionally, the one or more sensing modules comprise at least one of: an accelerometer sensor, a location sensor. More optionally, in this regard, the location-data comprises location of the user-device and accelerometer data of the user-device. In an example, the location sensor may be a global positioning tracking unit for detecting the location of the user-device. Notably, the global positioning tracking unit relates to specialized equipment operable to detect the location of the user-device. It will be appreciated that the detection of the location of the user-device by the server-arrangement relates to the aforesaid detection of the location by the system comprising the user-device and the server-arrangement. It will be appreciated that accelerometer data of the user-device comprises information pertaining to movement of the user-device. Example of such movements may include, but are not limited to, tilt, shake, rotation, or swing.

As mentioned previously, the method comprises retrieving, at the server-arrangement from the database-server, the client-data. Specifically, the system comprises the database-server for storing the client-data. As discussed earlier, the server-arrangement is communicably coupled with the database-server.

Optionally, the client-data comprises name and location information of existing or potential clients. In an example, when the user is a sales agent, the client-data may comprise name and address of the current clients associated with the sales agent. In such an example, the client-data may also comprise name and location information (namely, address) of the potential client. It will be appreciated that the location information comprises residential address and/or office address of the client. Furthermore, optionally, the client-data comprises time at which client is available for sales meeting.

Throughout the present disclosure, the term "database-server" as used herein relates to an organized body of digital information regardless of the manner in which the digital information or the organized body thereof is represented. Optionally, the database-server may be hardware, software, a firmware and/or any combination thereof configured to store and execute computational algorithms thereon. For example, the organized body of digital information may be in a form of a table, a map, a grid, a packet, a datagram, a file, a document, a list or in any other form. The database-server includes any data storage software and systems, such as, for example, a relational database like IBM DB2 and Oracle 9. Furthermore, the database-server refers to the software program for creating and managing one or more databases. Optionally, the database-server may be operable to support relational operations, regardless of whether it enforces strict adherence to the relational model, as understood by those of ordinary skill in the art.

Optionally, retrieving of client-data from the database-server comprises using at least one of a learning technique and/or a data mining technique on the database-server. Furthermore, natural language processing, text analytics and machine learning may be used in order to perceive contextual (namely, semantic, inferred) meaning of the elements in the existing data. Furthermore, the aforementioned techniques analyse (namely, parsing, comparing and so forth) elements of the database-server in order to identify contextual meaning thereof.

As mentioned previously, the method comprises determining the change in the location-data of the user-device. Specifically, the server-arrangement is configured to determine the change in the location-data of the user-device. In an embodiment, the server-arrangement is configured to continuously track the location-data of the user-device. In another embodiment, the server-arrangement is configured to track the location-data of user-device in a periodic manner. In yet another embodiment, the server-arrangement is configured to track the location-data of user-device in irregular manner. In operation, the server-arrangement receives the location-data from the one or more sensing modules to determine the change in the location-data. The server-arrangement then compares the received location-data with the previously received location-data. If the geographical coordinates of the user-device are changed, the server-arrangement determines that the location-data is changed. In an example, the server-arrangement tracks the geographical coordinates of the user-device at time 'T1' and determines the geographical coordinates to be 'L1'. In such an example, the server-arrangement tracks the geographical coordinates of the user-device at time 'T2' and determines the geographical coordinates to be 'L2'. The server-arrangement then compares both the geographical coordinates 11' and 'L2' and determines that both geographical coordinates of the user-device are different.

As mentioned previously, the method comprises generating the activity-data, based on the change in the location-data. Specifically, the server-arrangement is configured to generate the activity-data, based on the change in the location-data. In operation, when the server-arrangement determines that the location-data of the user is changed, the activity-data of the user is generated. Throughout the present disclosure, the term "activity-data" used herein relates to information pertaining to the activity performed by the user while executing the task. Optionally, activity-data of the activity comprises a start time of the activity, an end time of the activity, a completion time of the activity, and a nature of the activity. In a first instance, if the user is assigned a task of picking up a client from a location 'XYZ' at 14:00 hours, the user leaves from location 'PQR' at 11:00 hours. The user reaches the location 'XYZ' from the location 'PQR' at 13:00 hours. Thereafter, the user has his lunch from 13:00 hours till 14:00 hours and then picks up the client and reaches back to office at 16:00 hours. In such an example, the user is performing three activities, namely travelling (from 11:00 to 13:00 hours), having lunch (from 13:00 to 14:00 hours) and travelling back with the client (from 14:00 to 16:00 hours). The activity-data of the first activity (such as, travelling) may include, start time of the activity as 11:00, end time of the activity as 13:00, the completion time of the activity as two hours and the nature of the activity as 'Travelling'. Similarly, the activity-data of the second and third activity (such as, having lunch and travelling back) may include, the start time of the activity as 13:00 and 14:00, the end time of the activity as 14:00 and 16:00, the completion time of the activity as one and two hours and the nature of the activity as 'lunch' and 'Travelling' respectively. It will be appreciated that the nature of the activity can be listed as productive client interface activity, productive non-client interface activity, travelling, unproductive activities and so forth. Notably, the activity-data is generated every time the location-data of the user-device associated with the user changes. Furthermore, a timer is started or ended each time the change in location-data is determined.

As mentioned previously, the activity-data is generated by correlating the location-data with the client-data by employing machine learning techniques. Specifically, the server-arrangement is configured to correlate the location-data with the client-data by employing machine learning techniques. Optionally, the machine learning techniques are implemented using artificial intelligence algorithms. Examples of such artificial intelligence algorithms includes but are not limited to Linear Regression, Logistic Regression, Decision Tree, Gradient Boosting algorithms, deep learning techniques and so forth. Optionally, such artificial intelligence algorithms are executed on the user-device.

It will be appreciated that the term "machine learning" refers to learning techniques that comprise networks capable of unsupervised learning, semi-supervised learning or supervised learning from structured, unstructured, labelled or unlabelled data. Furthermore, the networks in the machine learning techniques imitate working of human brain in processing data records and creating clusters or patterns for use in decision making. In an example, the machine learning techniques may include Gaussian process model. It will be appreciated that Gaussian process the location-data and the client-data by mean function and covariance function. Additionally, covariance function is a measure of change in two user activities with respect to each other. Furthermore, the covariance function describes spatial or temporal covariance of a random activity performed by the user.

In an example, the activity-data is generated using stochastic gradient based technique. The stochastic gradient based technique computes the next update to the activity at each iteration which tend to converge very well to a local optima, wherein the local optima determines the best correlation. Beneficially, the stochastic gradient based technique reduces the chances of error in calculation of correlation by providing a stable and convergent value thereof.

Optionally, the server-arrangement trains the system based on activities performed by the user, by employing federated learning, and provides the most optimum and efficient outcome limiting the unnecessary/redundant download while saving system memory and power. It will be appreciated that by employing the federated learning, the activity-data is generated on the user-device. In other words, the machine learning techniques are executed on the user-device, and thus provides the most optimum and efficient outcome to the user limiting the unnecessary/redundant download while saving systems memory and power.

Beneficially, communication efficiency is of the utmost importance and minimizing the number of rounds of communication is the principal goal of federated learning.

Optionally, correlating the location-data with the client-data comprises identifying a pattern for activities of the task based on the correlation of the location data with the client-data. Throughout the present disclosure, the term "pattern" used herein relates to regular and intelligible form or sequence discernible in the way in which user performs the at least one activity. Notably, the server-arrangement uses the machine learning techniques to identify the pattern for activities of the task. Such patterns are determined based on the current location-data of the user and the client-data corresponding to activities assigned to the user as part of the task. The machine learning techniques are used to identify the correlation between the location-data and the client-data. The determination of the aforementioned correlation will be explained in conjunction with a following example.

In an exemplary implementation, the user is a sales agent required to perform multiple sales as part of a task. In such a case, the client-data includes name and location information (namely, address) of plurality of potential clients. The client-data may comprise client-data of two potential clients having name 'Jack' and 'James'. In this regard, the location information may include "address 1' and 'address 2' for 'Jack' and 'James' respectively. In such an example, the server-arrangement tracks the location-data of the user and uses an initial location-data as the baseline for further tracking. In other words, once the detected location-data of the user changes from the initial location-data, the server-arrangement will start generating activity-data. Firstly, the server-arrangement may start a timer at the start time of the activity. If the user is visiting the location 'address 1', the server-arrangement will employ the machine learning techniques to determine a correlation of such location-data with the client-data thereof. The server-arrangement identifies the pattern that the user was required to visit the location 'address 1' for performing sales meeting with the 'Jack'. Thus, the server-arrangement may determine the nature of the activity as 'productive work'. Furthermore, after spending a specific amount of time at the location 'address 1', the user goes to a location 'address 3' to meet a friend. Consequently, once the detected location-data of the user changes from the location-data having the location as 'address 1', to the location-data having the location as 'address 3', the server-arrangement correlates the location-data with the client-data, to identify a pattern that location 'address 3' is not associated with any client. Thus, the server-arrangement identifies that the user may not have visited the location 'address 3' for performing sales, and consequently, server-arrangement may determine the nature of the activity to be 'non-productive'. Thereafter, if the detected location-data of the user changes from the location-data having the location as 'address 3' to the location-data having the location as 'address 2', the server-arrangement identifies the pattern that the user has visited the location for the meeting with the 'James' at that location, using the client-data. Thus, the server-arrangement determines the nature of the activity as 'productive work'.

As mentioned previously, the method comprises processing the prompt-response generated by the manual-input at the user-device, wherein the prompt-response is generated based on the prompt provided by the server-arrangement to the user-device when the machine learning techniques fail to correlate the location data with the client-data. Once the location-data of the user-device changes, the timer is started. However, due to no correlation of the location-data with the client-data (such as, when the user visits the location 'address 3' in the exemplary implementation described hereinabove), the nature of activity is not determined. In such a case, the server-arrangement provides prompt to the user-device. Throughout the present disclosure, the term "prompt" used herein relates to a query, associated with the at least one activity, provided at the user interface of the user-device. Optionally, the query comprises two to eight (or more) options for the user to provide an input thereto, to enable the server-arrangement to determine the nature of the activity. In one embodiment, the prompt is in textual format. In another embodiment, the prompt is provided in image format. In yet another embodiment, the prompt is provided in video format. In yet another embodiment, the prompt is provided in audio format. In yet another embodiment, the prompt is provided as a combination of textual, image, audio and video format.

The user provides the prompt-response to the prompt provided by the server-arrangement. Throughout, the present disclosure, the term "prompt-response" used herein relates to interaction of the user with the prompt. The user interacts with the prompt based on the user interface of the user-device. For example, if the user interface of the user-device is a touch-sensitive surface, the user interacts with prompt via tactile input by using fingers or a stylus. In such an example, since the user is provided with two to eight options (or more) to select from, the user may select the nature of activity using one-touch. Beneficially, such one-touch saves time of the user to interact with the prompt. In another example, if the user interface is gesture-based, the user interacts with the prompt through hovering the hand and/or other body parts over the user interface of the user-device. In yet another example, if the user interface is a display screen, the user may use a mouse or a touchpad to interact with the prompt. Such prompt-response of the user with the prompt is transmitted to the server-arrangement. It will be appreciated that the prompt response is unitized to efficiently learn the correlation of the location-data with the client-data. Optionally, the prompt-response is stored on a memory unit of the user-device and utilized to learn the correlation of the location-data with the client-data using federated learning.

The server-arrangement then processes the prompt-response with the start time and the end time of the activity to generate the activity-data. Optionally, the server-arrangement provides more than one prompt to the user-device based on the change in the location-data of the user-device associated with the user. In an example, the location-data of the user-device changes for three times to locations not associated with the client-data and in such an instance, the machine learning techniques fail to correlate the location-data with the client-data. In such an example, the prompt will be provided to the user-device for the three times. Notably, the prompts and the corresponding prompt-responses are communicated in a sequential order. For example, the sequential order includes sequentially following the first prompt, the first prompt-response, the second prompt, the second prompt-response, the third prompt and the third prompt-response. In another example, the machine learning techniques may be able to successfully correlate the location-data with the client-data for one of the three times, but may fail to do for the other two times. In such an example, the prompt will be provided to the user-device for the two times when the machine learning techniques fail to correlate the location-data with the client-data.

Optionally, the method further comprises retrieving, at the server-arrangement from the database-server, a schedule-data of the at least one activity defining the task. Specifically, the system comprises the database-server for storing the schedule-data of the at least one activity defining the task. As discussed earlier, the server-arrangement is communicably coupled with the database-server.

Optionally, the schedule-data of the user comprises at least one of calendar data associated with the task assigned to the user, sales information. Notably, the schedule-data comprises a time-table of the user, thereby providing a list of tasks that are to be carried out by the user. In other words, the calendar data associated with the task assigned to the user may include a list of tasks that needs to be completed by the user. Optionally, the schedule-data further includes location and time by which the task should be done. Moreover, optionally, the sales include the potential client data where probability of sale is high. Such client data may include availability of the client along with the location thereof. In an example, a user 'ABC' is assigned to conduct two sale meetings with two different clients at different locations. In such an example, the schedule-data may include information of client locations and their meeting times. Furthermore, optionally, the schedule-data comprises email, chat, inter-company communications.

Optionally, correlating the location-data with at least one of the client-data and the schedule-data comprises identifying a pattern for activities of the task based on the correlation of the location data with at least one of the client-data and the schedule-data. Throughout the present disclosure, the term "pattern" used herein relates to regular and intelligible form or sequence discernible in the way in which user performs the at least one activity. Notably, the server-arrangement uses the machine learning techniques to identify the pattern for activities of the task. Such patterns are determined based on the current location-data of the user and the client-data corresponding to activities assigned to the user as part of the task. The machine learning techniques are used to identify the correlation of the location-data with at least one of the client-data and the schedule-data. The determination of the aforementioned correlation will be explained in conjunction with a following example.

In a first exemplary implementation, the user is a sales agent that is required to perform two sales as part of a task, wherein the sales are required to be made to two different clients located at different locations 'A' and 'B'. The client-data may include client 'V' located at address 'W', whilst the schedule-data of the user includes that the user will be having a meeting with a client located at the location 'A' at time 'T1', and a meeting with a client located at the location 'B' at time 'T2' for performing the sales to each of the clients respectively. In such an example, the server-arrangement tracks the location-data of the user and uses an initial location-data as the baseline for further tracking. In other words, once the detected location-data of the user changes from the initial location-data, the server-arrangement will start generating activity-data. Firstly, the server-arrangement may start a timer at the start time of the activity. If the user is visiting the location 'A' at time 'T1', the server-arrangement will employ the machine learning techniques to determine a correlation of such location-data with at least one of the client-data and the schedule-data thereof. The server-arrangement identifies the pattern that the user was required to visit the location 'A' at time 'T1' for meeting with the client, using the schedule-data. Thus, the server-arrangement may determine the nature of the activity as 'productive work'. Furthermore, after spending a specific amount of time at the location 'A' after time 'T1' (and before time 'T2'), the user goes to a location 'C' to meet a friend. Consequently, once the detected location-data of the user changes from the location-data having the location as 'A', to the location-data having the location as 'C', the server-arrangement correlates the location-data with at least one of the client-data and the schedule-data of the user, to identify a pattern that the visit to the location 'C' was not part of the schedule of the user. Thus, the server-arrangement identifies that the user may not have visited the location 'C' for performing either of the sales assigned thereto, and consequently, server-arrangement may determine the nature of the activity to be 'non-productive'. Thereafter, if the detected location-data of the user changes from the location-data having the location as 'C' to the location-data having the location as 'B' at time 'T2', the server-arrangement identifies the pattern that the user has visited the location for the meeting with the client at that location, using the schedule-data (since location 'B' is not present in the client-data). Thus, the server-arrangement determines the nature of the activity as 'productive work'.

Optionally, the method further comprises processing a prompt-response generated by a manual-input at the user-device, wherein the prompt-response is generated based on a prompt provided by the server-arrangement to the user-device when the machine learning techniques fail to correlate the location data with at least one of the client-data and the schedule-data. In such a case, once the location-data of the user-device changes, the timer is started. However, due to no correlation of the location-data with at least one of the client-data and the schedule-data (such as, when the user visits the location 'C' in the first exemplary implementation described hereinabove), the nature of activity is not determined. In such a case, the server-arrangement provides prompt to the user-device. In an example, the prompt may include four options namely, client interface activity, productive non-client interface activity, travelling, unproductive activities. Thereafter, the user may select one of the four options by one-touch.

Optionally, the method further comprises retrieving, at the server-arrangement from the database-server, a historical data of activities performed by the user. Specifically, the database-server is further configured to store the historical data of activities performed by the user, such as, along with the schedule-data and the client-data. In such an instance, co-occurrence of elements of the schedule-data and historical data may be checked. Furthermore, co-occurrence of elements of the target data refers to use of the elements of the schedule-data and historical data together in order to convey information. Optionally, the historical data comprises at least one of schedule-data of the at least one previous activity, previous sales information, previous locations visited, time associated with visit of the previous locations. Furthermore, the term "historical data" used herein relates to previous activities carried out by the user. Optionally, the historical data relates to a periodically stored data associated with activity performed by the user. In an instance, the historical data of a user may include data related to locations that are visited by the user. In such an instance, the historical data may also include data related to time of visit and nature of activity performed by the user at the visited locations. In an example, the user 'ABC' has visited 30 different places at different time slots. The historical data may include all the places visited by the user 'ABC' in the past along with the time of each visit. In another example, the historical data also includes previous sales information associated with the user. In yet another example, the historical data may also include all the previous locations visited by the user along with the time of visit for day-to-day activities such as lunch, dinner, movies and so forth. It will be appreciated that such, client-data, historical data and schedule-data may be received by the database-server from an existing company database or customer relationship management software.

Optionally, the method further comprises correlating the location-data with at least one of the client-data, the schedule-data and the historical data by employing machine learning techniques. Such correlating of the location-data with the historical data comprises identifying a pattern for activities of the task based on the correlation of the location data with the historical data. Notably, the server-arrangement uses the machine learning techniques to identify the pattern for activities of the task. Such patterns are determined based on the current location-data of the user and the historical data corresponding to various activities performed by the user in the past. The machine learning techniques are used to identify the correlation between the location-data and the historical data. The determination of the aforementioned correlation will be explained in conjunction with a following example.

In a second exemplary implementation, the historical data of the user includes that the user has previously visited locations 'A' and 'B' for client meetings at time 'X' and 'Y', while the user has visited location 'C' frequently to watch a movie at time 'T1'. The client-data may include client 'V' located at address 'W', whilst the schedule-data of the user includes that the user have a meeting with a client at location 'D' at time 'T2'. In such an example, the server-arrangement tracks the location-data of the user and uses an initial location-data as the baseline for further tracking. In other words, once the detected location-data of the user changes from the initial location-data, the server-arrangement will start generating activity-data. Firstly, the server-arrangement may start a timer at the start time of the activity. If the user is visiting the location 'A' at time 'X', the server-arrangement will employ the machine learning techniques to determine a correlation of the location-data with at least one of the client-data, the schedule-data and the historical data. The server-arrangement identifies the pattern that in the past, the user had visited the same location for meeting with the client. Thus, the user may determine the nature of the activity as 'productive work'. Furthermore, in such an instance, if the detected location-data of the user changes from the initial location data, to location-data having location as 'C' at time 'T1', the server-arrangement identifies the pattern that in past the user had visited the same location to watch a movie. Thus, the user may determine the nature of the activity as 'entertainment' (or 'non-productive work'). In such an example, if the detected location-data of the user changes from the initial location-data, to location-data having location as 'W', the server-arrangement identifies the pattern that the user has a meeting with the client at that location, using client-data, and thereby, determines the nature of the activity as 'productive work'. Thereafter, if the detected location-data of the user changes from the initial location-data, to location-data having location as 'D' at time 'T2', the server-arrangement identifies the pattern that the user has a meeting with the client at that location, using schedule-data, and thereby, determines the nature of the activity as 'productive work'.

Optionally, the method further comprises processing a prompt-response generated by a manual-input at the user-device, wherein the prompt-response is generated based on a prompt provided by the server-arrangement to the user-device when the machine learning techniques fail to correlate the location data with at least one of the client-data, the schedule-data and the historical data. As discussed in the second exemplary implementation, the machine learning techniques are used identify the correlation of the location-data with at least one of the client-data, the schedule-data and historical data. However, in such an implementation, the detected location-data of the user changes from the initial location-data, to location-data having location as 'F' at time 'T3'. The server-arrangement fails to identify the correlation between the of the location-data (location as 'F' at time 'T3')

with at least one of the client-data, the schedule-data and the historical data, since the user might be visiting the location 'F' for the first time and this location is also not found in the client-data, the schedule-data or the historical data associated therewith. In such a case, the server-arrangement provides a prompt to the user-device. The prompt may include four options namely, client interface activity, productive non-client interface activity, travelling, unproductive activities. Thereafter, the user may select one of the four options by one-touch.

It will be appreciated that the prompt response is unitized to train the machine learning techniques to efficiently identify the correlation of the location-data with at least one of the client-data, the schedule-data and the historical data. In an example, social networking sites continuously track the location of their users. In such an example, the social networking sites may implement the aforementioned method and system to efficiently learn the correlation of the location-data with at least one of the client-data, the schedule-data and the historical data. The users may get a prompt on their respective user-devices about confirming the nature of activity. The user may provide a one-touch prompt-response to the prompt. The server-arrangement then generates the activity-data for the corresponding users. The generated activity-data is utilized to train the machine learning techniques to accurately determine the pattern for activities of the task based on the correlation of the location-data with at least one of the client-data, the schedule-data and the historical data.

Optionally, the method comprises presenting the generated activity-data on the user-device. The server-arrangement is configured to present the generated activity-data on the user-device. Once the activity-data is generated, the server-arrangement collects all the activity-data of each activity performed during the execution of the task. The collected activity-data is then arranged in a form of report and transmitted to the user-device. It will be appreciated that the generated activity-data can be arranged in any manner based on the user's requirement.

Optionally, the generated activity-data is stored in a local database server. Optionally, the local database-server may be hardware, software, a firmware and/or any combination thereof configured to store and execute computational algorithms thereon. For example, the organized body of related data may be in a form of a table, a map, a grid, a packet, a datagram, a file, a document, a list or in any other form. The local database-server includes any data storage software and systems, such as, for example, a relational database like IBM DB2 and Oracle 9. Alternatively, optionally, the activity-data is stored in a memory unit of the user-device.

More optionally, the user-device comprises a first user-device and a second user-device, and wherein the generated activity-data is presented at the first user-device in a different manner than the second user-device. In such a case, the location-data of the first user is tracked, thereby generating the activity-data of the first user. A report of the generated activity-data of the first user is then transmitted to the first user-device and the second user-device. The representation of such report is different on the first user-device as compared to the second user-device. In an example, the first user may be an employee of a sales company and the second user is a manager of the first user. Since the second user may be managing a plurality of users, therefore, the generated activity-data of the first user is transmitted in such a manner that the second user can easily evaluate the performance of each of the employees. For example, the report may comprise graphs, charts, pie charts and so forth. Furthermore, the second user may also compare the productivity of the first user with another user based on representation of the generated activity-data of all employees. It will be appreciated that the representation of the activity-data can be modified by user of corresponding user-device.

Optionally, the tracking of the user-device is initiated based on one of:

a pre-defined time, a user-defined time, and the historical data. In one embodiment, the tracking of the user-device is initiated based on the pre-defined time. In such an embodiment, the tracking is initialized by the server-arrangement based on normal working hours of the user. For example, if the user leaves for work at 9:00 AM, the pre-defined time may be set at 9:00 AM. In such a case, the server-arrangement may start tracking the user-device at 9:00 AM daily. In another embodiment, the tracking of the user-device is initiated based on the user-defined time. In such an embodiment, the user may be initiating the tracking manually before executing the task. In another embodiment, the tracking of the user-device is initiated based on the historical data. In such an embodiment, the machine learning techniques may identify the working hours of the user based on historical data and initiate the tracking of the user-device accordingly. In an example, if the user has day off on Tuesday and Wednesday of every week, the machine learning techniques may identify the pattern and thus, may not initiate tracking of the user-device on these days.

Optionally, terminating the tracking of the user-device is based on one of: a re-defined time, a user-defined time, and the historical data. In one embodiment, the tracking of the user-device is terminated based on the pre-defined time. In such an embodiment, the tracking is terminated by the server-arrangement based on normal working hours of the user. For example, if the user leaves from work at 6:00 PM, the pre-defined time may be set at 6:00 PM. In such an example, the server-arrangement may terminate the tracking of the user-device at 6:00 PM daily. In another embodiment, the tracking of the user-device is terminated based on the user-defined time. In such an embodiment, the user may terminate the tracking manually after executing the task. In another embodiment, the tracking of the user-device is terminated based on the historical data. In such an embodiment, the machine learning techniques may identify the working hours of the user based on historical data and initiate the tracking of the user-device accordingly. In an example, the machine learning techniques may identify a pattern about when the user leaves from work and thereby terminate the tracking.

In an embodiment, the aforementioned method and system can be implemented by the user to track sales agents associated with a company of the user. In such an instance, each sales agent associated with the company of the user may be assigned a different sales task to be completed before end of each day. Furthermore, the sales agents may be required to conduct meetings with various clients during the day to execute such sales. Information (namely, name and address) associated with various clients corresponds to the client-data. Such meetings may be pre-arranged with the clients within specific time slots during the day and the sales agents will be required to conduct the meetings at the specific time slots for a possibility of executing a successful sale. Thus, the sales agents may be required to strictly adhere to a daily schedule generated for them, wherein the information of such a schedule for the sales agents may correspond to the schedule-data. In such an instance, upon a sales agent's visit to a location of a first client, the server-arrangement determines the change in location of the sales agent from an initial location thereof to the location of the first client. Thereafter, the server-arrangement tracks a time spent by the sales agent for performing the meeting with the client, based on change in location of the sales agent from the location of the first client to another location (such as, to visit another client). Furthermore, if any sales agent visits a location that is not associated with any client thereof, the server-arrangement correlates the location-data with the client-data to determine that the sales agent may be performing non-productive work. Such information of the non-productive work may be retrieved by the user, to enable the user to determine a total amount of productive time spent by each of the sales agents during the day.

In another embodiment, the aforementioned method and system can be implemented by the user to conduct a one-touch survey for his/her customers who have recently visited their store to extract store experience details in a non-intrusive way. In an example, once the server-arrangement determines that a customer is visiting the store, a timer would begin and would run until the server-arrangement determines that the location-data is changed. In other words, the timer would stop once the costumer has left the store. Upon completion of the visit, the server-arrangement may provide a prompt to the user with a query that would present the user with one to four options that would allow the user to quickly describe the nature of their visit to the store. In such an example, the server-arrangement receives a prompt-response and combines the prompt-response with start time of the visit, end time of the visit and completion time of the visit to generate the activity-data. Beneficially, the server-arrangement further presents the activity-data on a user-device associated with the user. The retailer may utilize the activity-data to perform additional data mining techniques on the activity-data.

In yet another embodiment, the aforementioned system and method can be adapted for users to track their everyday life more efficiently. In such an embodiment, the user can determine how they are spending their time and thereby manage their time for better productivity. It will be appreciated that the nature of the activity can be listed as "work", "shopping" or "entertainment" and so forth. In an example, If the user is visiting a grocery store from time 'X1' to 'X2', the server-arrangement will employ the machine learning techniques to determine a correlation with the client-data, the schedule-data or historical data. If the user has previously visited the store, the server-arrangement identifies the pattern that the in past the user had visited the same location for shopping. Thus, the user may determine the nature of the activity as "shopping". The server-arrangement combines the nature of the activity with start time of the visit (X1), end time of the visit (x2) and completion time of the visit (X2–X1) to generate the activity-data. Furthermore, in such an example, the server-arrangement may also provide recommendations to improve the time spent for shopping. In this regard, if the total time of visit of the user was three hours, the server-arrangement may provide recommendations of grocery stores that provide pick-up or delivery services. In such an example, if the server-arrangement fails to identify the correlation between the location-data with the at least one of client-data, schedule-data and the historical data, the server-arrangement provides a prompt to the user-device. The server-arrangement receives a prompt response from the user and generates the activity-data to be presented to user.

DETAILED DESCRIPTION OF THE DRAWINGS

Referring to FIG. 1, illustrated is a block diagram of a system 100 for collecting activity-data of a user executing a task including at least one activity, in accordance with an embodiment of the present disclosure. The system 100 comprises a user-device 102 having one or more sensing modules, depicted as sensing modules 104 and 106, to track a location-data; a database-server 108 for storing a client-data; and a server arrangement 110 communicably coupled with the user-device 102 and database-server 108. The server arrangement 110 is configured to track the user-device 102 to determine the location-data of the user-device 102 associated with the user, retrieve the schedule-data from the database-server 108, determine a change in the location-data of the user-device 102, and generate the activity-data, based on the change in the location-data, by one of correlating the location-data with the client-data by employing machine learning techniques, or processing a prompt-response generated by a manual-input at the user-device 102, wherein the prompt-response is generated based on a prompt provided by the server-arrangement 110 to the user-device 102 when the machine learning techniques fail to correlate the location-data with the client-data.

Figure 2:
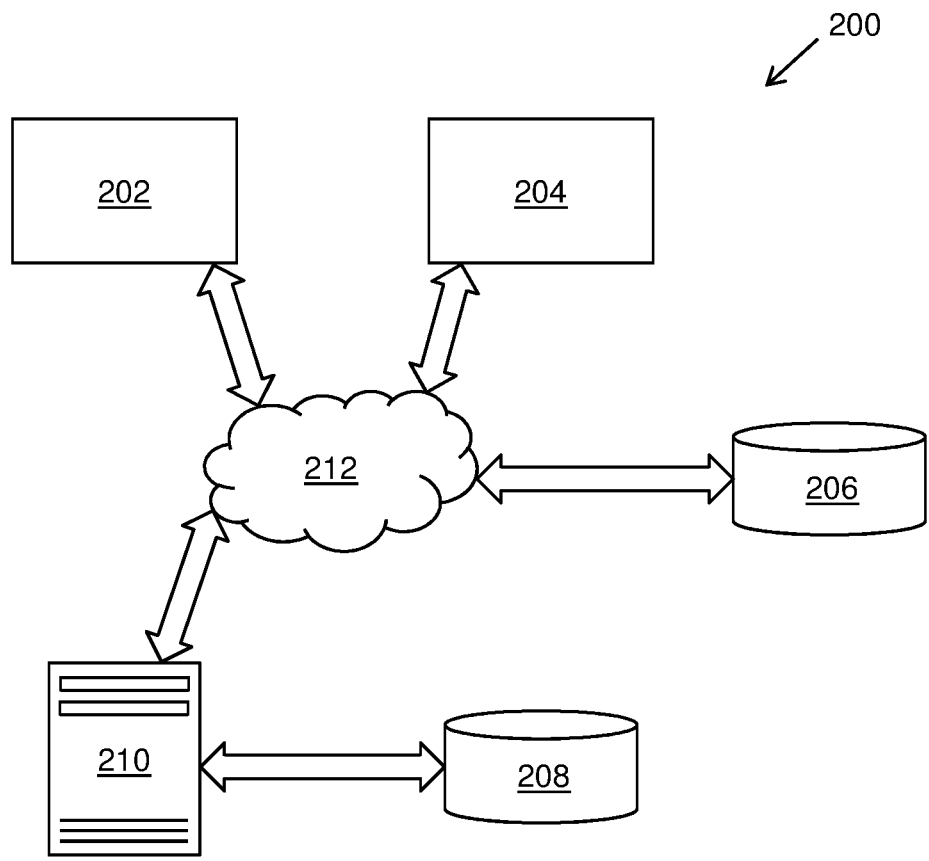
FIG. 2 is a schematic illustration of a system for collecting activity-data of a user executing a task including at least one activity, in accordance with an embodiment of the present disclosure.

Referring to FIG. 2, illustrated is a schematic illustration of a system 200 for collecting activity-data of a user executing a task including at least one activity, in accordance with an embodiment of the present disclosure. The system 200 comprises a first user-device 202 and a second user-device 204, a database-server 206 for storing at least one of client-data, a schedule-data of the at least one activity defining the task and a historical data of activities performed by the user, a local database-server 208 for storing the activity-data of the user locally, a server arrangement 210 communicably coupled with the first user-device 202, the second user-device 204, database-server 206, and local database server 208, a communication network 212 coupling the first user-device 202 and the second user-device 204, the database-server 206, the local database-server 208, and the server arrangement 210.

Figure 3:
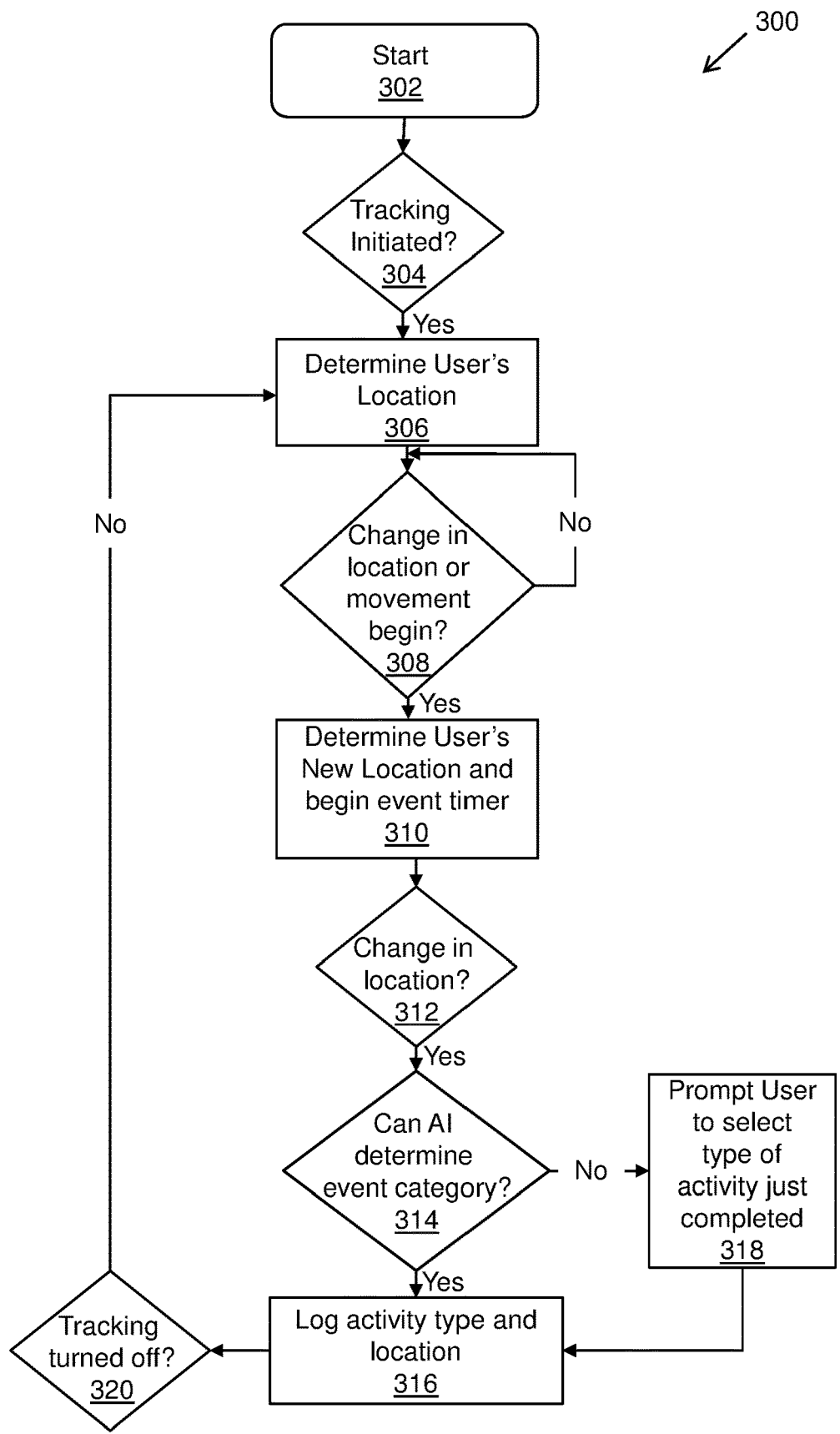
FIG. 3 illustrates an exemplary flow chart of steps for collecting activity-data of a user executing a task including at least one activity, in accordance with an embodiment of the present disclosure.

Referring to FIG. 3, illustrated is an exemplary flow chart 300 of steps for collecting activity-data of a user executing a task including at least one activity, in accordance with an embodiment of the present disclosure. At a step 302, tracking of a user-device is initiated to determine a location-data of the user-device associated with the user. At a step 304, a check is done to ensure tracking is initiated. At a step 306, upon the start of tracking, the location-data of the user-device is determined. At a step 308, a change in the location-data of the user-device is determined. If there is no change in the location-data, the step 308 is performed again. At a step 310, upon change in the location-data of the user-device, a new location-data of the user-device is determined and a timer is started to determine the duration of the activity. At a step 312, tracking is initiated to determine a further change in the location-data of the user-device. If there is no change in the location-data, the step 312 is performed again. At a step 314, upon change in the location-data of the user-device, machine learning techniques like artificial intelligence are employed to generate activity-data. At step 316, upon successful generation of activity-data by machine learning techniques, the nature of the activity and completion time of the activity is stored. At step 318, upon unsuccessful generation of activity-data by machine learning techniques, a prompt-response is generated based on a prompt provided by the server-arrangement to the user-device. Thereafter, the step 316 is performed to store the nature of the activity and completion time of the activity. At a step 320, a check is performed to check whether the tracking is turned off. If tracking is not turned off, steps 306 is performed.

Figure 4:
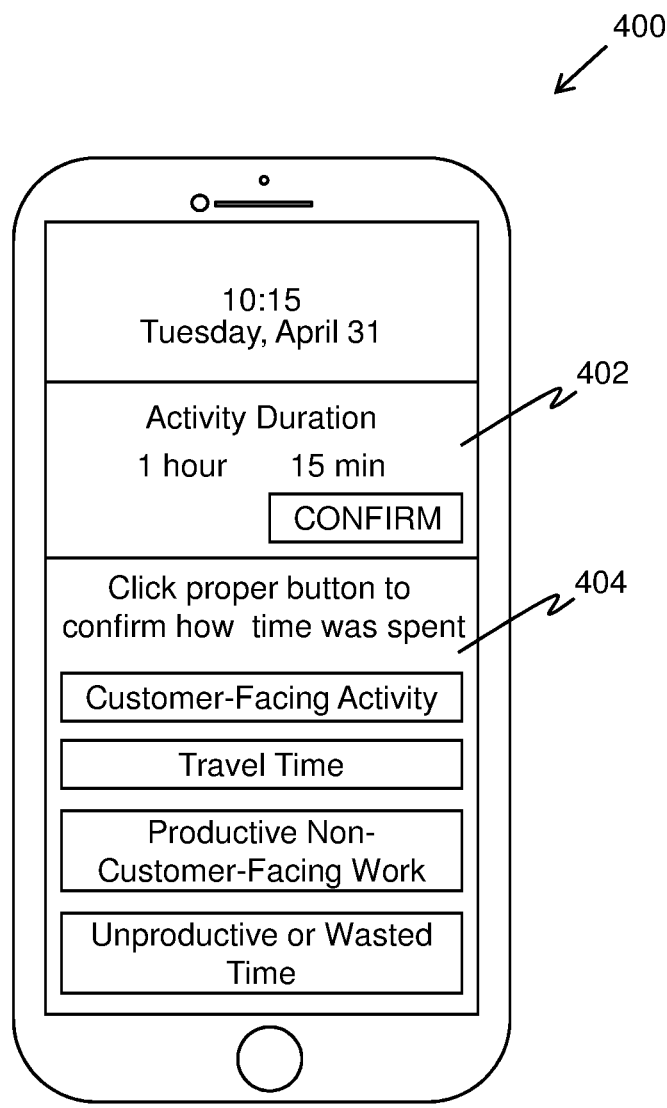
FIG. 4 is an illustration of exemplary user-interface of a user-device, in accordance with an embodiment of the present disclosure.

Referring to FIG. 4, illustrated is an exemplary user-interface of a user-device 400, in accordance with an embodiment of the present disclosure. As shown, the user-device 400 depicts a prompt provided by the server-arrangement (not shown). The prompt comprises a first prompt 402 (namely, activity duration) and a second prompt 404 (namely, nature of the activity). The user interacts with the first prompt 402 and second prompt 404 by providing first prompt-response and second prompt response respectively. The prompt-response to be generated by a manual-input at the user-device 400. The first prompt 402 requires the prompt-response about the duration of the activity executed by the user. The second prompt 404 requires the prompt-response about the nature of activity among consumer facing activity, travel time, productive non-consumer facing work, and unproductive or wasted time executed by the user.

Figure 5:
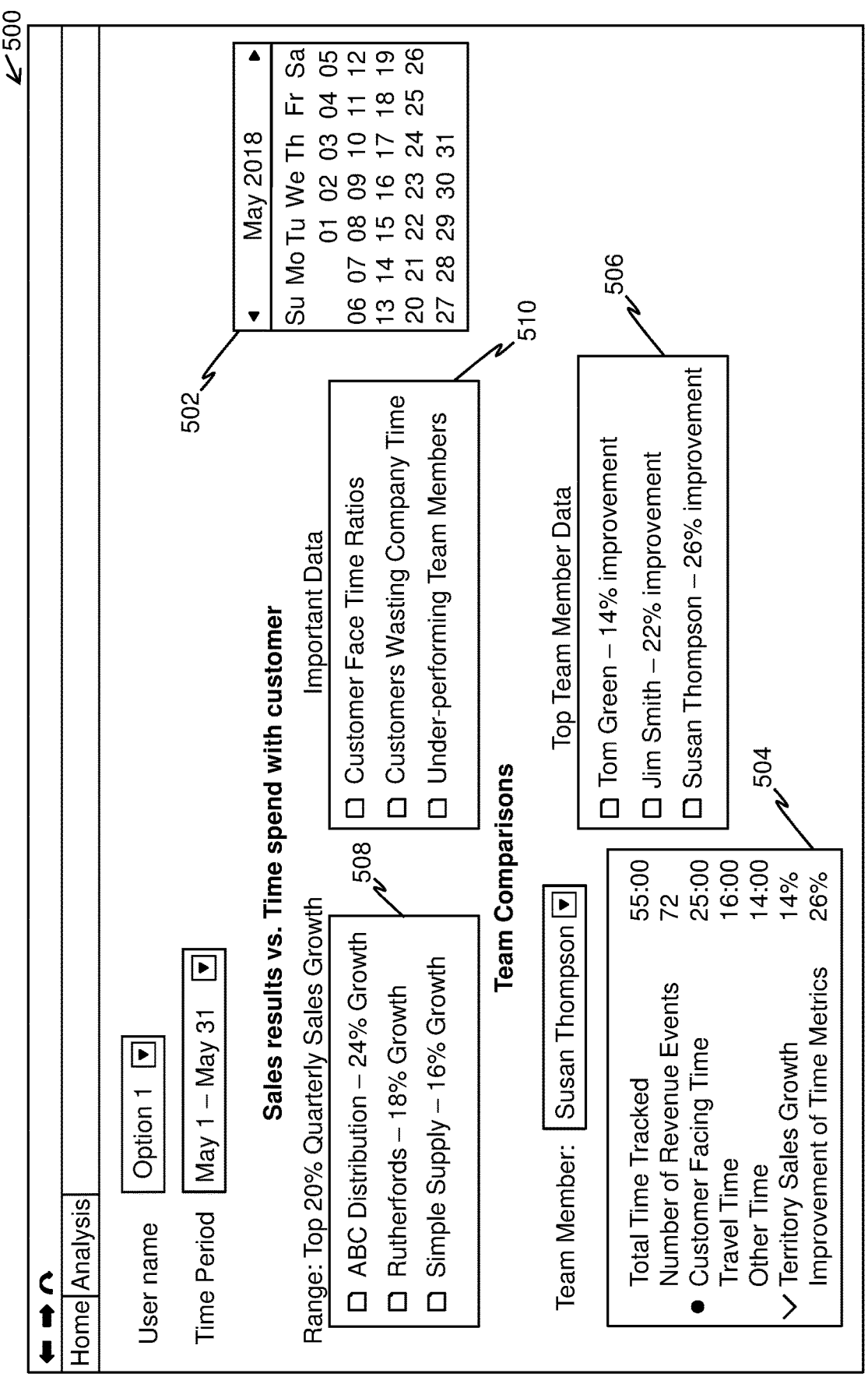
FIG. 5 is an illustration of exemplary user-interface of a user-device, in accordance with another embodiment of the present disclosure.

Referring to FIG. 5, illustrated is an exemplary user-interface of a user-device 500 (particularly, second user-device), in accordance with another embodiment of the present disclosure. As shown, a report of generated activity-data of various first users is depicted. The second user-device 500 allows a second user (namely, manager) to compare performance of various first users (namely, employees) in a team over a period of time. The second user can select dates from a calendar 502. The second user can view performance of a particular member with the help of various parameters 504, the parameters 504 include total time tracked, number of revenue events, customer facing time, travel time, other time, territory sales growth, and improvement of time metrics. The second user can view the percentages of improvement 506 in performance of team members. The second user can view the growth in the sales 508. The second user can also view important data 510 like customer face time ratios, customers wasting company time, and under-performing team members. It will be appreciated that the user-interface for the first user (not shown) may depict only the activity-data of the associated user on the first user-device.

Figure 6:
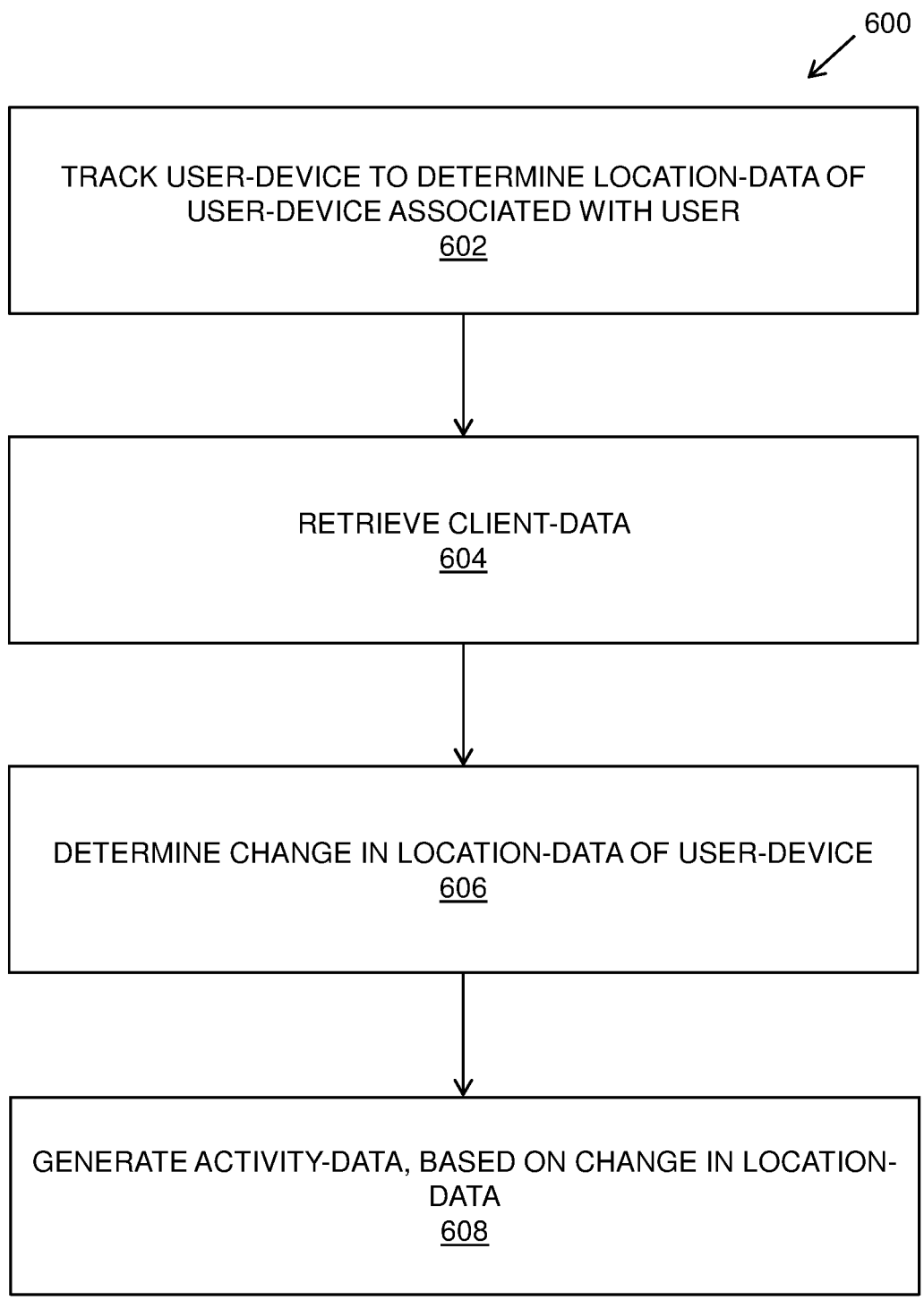
FIG. 6 illustrates steps of a method for collecting activity-data of a user executing a task including at least one activity, in accordance with an embodiment of the present disclosure.

Referring to FIG. 6, illustrated are steps of a method 600 for collecting activity-data of a user executing a task including at least one activity, in accordance with an embodiment of the present disclosure. At step 602, a user-device is tracked to determine a location-data of the user-device associated with the user. At step 604, a client—is retrieved at a server-arrangement from a database-server. At step 606, a change in the location-data of the user-device is determined. At step 608, the activity-data is generated. Furthermore, the activity-data is generated based on the change in the location-data, by one of correlating the location-data with the client-data by employing machine learning techniques, or processing a prompt-response generated by a manual-input at the user-device, wherein the prompt-response is generated based on a prompt provided by the server-arrangement to the user-device when the machine learning techniques fail to correlate the location-data with the client-data.

The steps 602 to 608 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for collecting activity-data of a user executing a task including at least one activity, the method comprising:
   assigning the user the task comprising at least one activity related to a client
   tracking a hardware user-device to determine a location-data of the user-device associated with the user;
   retrieving, at a server-arrangement from a hardware database-server, a client-data comprising at least a client name and an office address of the client;
   determining a change in the location-data of the user-device;
   generating the activity-data based on the change in the location-data, wherein the activity data comprises data related to the at least one activity comprising one or more of a start time of the activity, an end time of the activity, a completion time of the activity, and a nature of the activity, and wherein generating the activity data comprises:
   initiating a correlation of the location-data with the client-data by employing machine learning techniques and generating the activity data if the correlation is successful; and
   if the correlation fails, processing a prompt-response generated by a manual-input at the user-device, wherein the prompt-response is generated based on a prompt for the nature of the at least one activity related to the client provided by the server-arrangement to the user-device.

2. The method according to claim 1, further comprising retrieving, at the server arrangement from the database-server, a schedule-data of the at least one activity defining the task, wherein generating the activity-data further comprises one of
   correlating the location-data with at least one of the client-data and the schedule-data by employing the machine learning techniques, or
   processing the prompt-response generated by the manual-input at the user-device, wherein the prompt-response is generated based on the prompt provided by the server-arrangement to the user-device when the machine learning techniques fail to correlate the location data with at least one of the client-data and the schedule-data.

3. The method according to claim 1, further comprising retrieving, at the server-arrangement from the database-server, a historical data of activities performed by the user, wherein generating the activity-data further comprises one of:
   correlating the location-data with at least one of the client-data, the schedule-data and the historical data by employing the machine learning techniques, or
   processing the prompt-response generated by the manual-input at the user-device, wherein the prompt-response is generated based on the prompt provided by the server-arrangement to the user-device when the machine learning techniques fail to correlate the location data with at least one of the client-data, the schedule-data and the historical data.

4. The method according to claim 1, wherein the tracking of the user-device is initiated based on one of:
   a pre-defined time;

a user-defined time; and
a historical data.

5. The method according to claim 1, further comprising terminating the tracking of the user-device based on one of:
a pre-defined time;
a user-defined time; and
a historical data.

6. The method according to claim 1, wherein correlating the location-data with the client-data, a schedule-data and a historical data comprises identifying a pattern for activities of the task based on the correlation of the location data with at least one of the client-data, the schedule-data and the historical data.

7. The method according to claim 1, further comprising presenting the generated activity-data on the user-device.

8. The method according to claim 1, wherein the user-device comprises a first user-device and a second user-device, and wherein the generated activity-data is presented at the first user-device in a different manner than the second user-device.

9. The method according to claim 1, wherein the client-data comprises name and location information of existing or potential clients.

10. The method according to claim 1, wherein a historical data comprises at least one of schedule data of the at least one previous activity, previous sales information, previous locations visited, time associated with visit of the previous locations.

11. The method according to claim 1, wherein a schedule data comprises at least one of calendar data associated activities with the task assigned to the user and sales information.

12. The method according to claim 1, wherein the machine learning techniques are implemented using artificial intelligence algorithms.

13. The method according to claim 1, wherein the location-data comprises
location of the user-device; and
accelerometer data of the user-device.

14. A system for collecting activity-data of a user executing a task including at least one activity, the system comprising:
a hardware user-device having one or more sensing modules to track a location-data;
a hardware database-server for storing a client-data; and
a server arrangement communicably coupled with the user-device and the database-server, wherein the server arrangement is configured to:
assign a user a task comprising at least one activity related to a client;
track the user-device to determine the location-data of the user-device associated with the user;
retrieve the client-data from the database-server, the client-data comprising at least a client name and an office address of the client;
determine a change in the location-data of the user-device;
generate the activity-data based on the change in the location-data, wherein the activity data comprises data related to the at least one activity comprising one or more of a start time of the activity, an end time of the activity, a completion time of the activity, and a nature of the activity, and wherein generating the activity data comprises:
initiating a correlation of the location-data with the client-data by employing machine learning techniques and generating the activity data if the correlation is successful; and
if the correlation fails, processing a prompt-response generated by a manual-input at the user-device, wherein the prompt-response is generated based on a prompt for the nature of the at least one activity related to the client provided by the server-arrangement to the user-device.

15. The system according to claim 14, wherein the database-server is further configured to store a schedule-data of the at least one activity defining the task, and wherein the server arrangement is further configured to:
retrieve the schedule-data from the database-server; and
generate the activity-data, based on the change in the location-data, by one of correlating the location-data with the schedule-data by employing the machine learning techniques, or
processing the prompt-response generated by the manual-input at the user-device, wherein the prompt-response is generated based on the prompt provided by the server-arrangement to the user-device when the machine learning techniques fail to correlate the location data with at least one of the client-data and the schedule-data.

16. The system according to claim 15, wherein the schedule data comprises at least one of calendar data associated with the task assigned to the user, sales information.

17. The system according to claim 14, wherein the database-server is further configured to store a historical data of activities performed by the user; and wherein the server arrangement is further configured to:
retrieve the historical data from the database-server; and
generate the activity-data, based on the change in the location-data, by one of
correlating the location-data with the historical data by employing the machine learning techniques, or
processing the prompt-response generated by the manual-input at the user-device, wherein the prompt-response is generated based on the prompt provided by the server-arrangement to the user-device when the machine learning techniques fail to correlate the location data with at least one of the client-data, a schedule-data and the historical data.

18. The system according to claim 17, wherein the server arrangement is configured to initiate the tracking of the user-device based on one of:
a pre-defined time;
a user-defined time; and
the historical data.

19. The system according to claim 17, wherein the tracking of the user-device is terminated based on one of:
a pre-defined time;
a user-defined time; and
the historical data.

20. The system according to claim 17, wherein correlating the location-data with the client-data, the schedule-data and the historical data comprises identifying a pattern for activities of the task based on the correlation of the location data with at least one of the client-data, the schedule-data and the historical data.

21. The system according to claim 17, wherein the historical data comprises at least one of schedule data of the at least one previous activity, previous sales information, previous locations visited, time associated with visit of the previous locations.

22. The system according to claim 14, wherein the one or more sensing module comprises one or more of an accelerometer sensor, a location sensor.

23. The system according to claim 14, wherein the server arrangement is further configured to present the generated activity-data on the user-device.

24. The system according to claim 14, wherein the user-device comprises a first user-device and a second user-device, and wherein the generated activity-data is presented at the first user-device in a different manner than the second user-device.

25. The system according to claim 14, wherein the client-data comprises name and location information of existing or potential clients.

26. The system according to claim 14, wherein the machine learning techniques is implemented using artificial intelligence algorithms.

* * * * *